US011255960B2

(12) United States Patent
Kolouri et al.

(10) Patent No.: US 11,255,960 B2
(45) Date of Patent: Feb. 22, 2022

(54) SYNTHETIC APERTURE RADAR (SAR) BASED CONVOLUTIONAL NAVIGATION

(71) Applicant: The Boeing Company, Chicago, IL (US)

(72) Inventors: Soheil Kolouri, Calabasas, CA (US); Shankar R. Rao, Norwalk, CA (US)

(73) Assignee: The Boeing Company, Chicago, IL (US)

( * ) Notice: Subject to any disclaimer, the term of this patent is extended or adjusted under 35 U.S.C. 154(b) by 224 days.

(21) Appl. No.: 16/752,575

(22) Filed: Jan. 24, 2020

(65) Prior Publication Data

US 2021/0231795 A1 Jul. 29, 2021

(51) Int. Cl.

*G01S 13/90* (2006.01)
*G01S 7/41* (2006.01)
*G01S 13/00* (2006.01)

(52) U.S. Cl.

CPC .......... *G01S 13/9027* (2019.05); *G01S 7/417* (2013.01); *G01S 13/9052* (2019.05)

(58) Field of Classification Search

CPC ... G01S 13/9027; G01S 7/417; G01S 13/9052
See application file for complete search history.

(56) References Cited

U.S. PATENT DOCUMENTS

| | | | | |
|---|---|---|---|---|
| 4,564,839 | A * | 1/1986 | Powell | G01S 13/9027 342/25 A |
| 6,781,541 | B1 * | 8/2004 | Cho | G01S 13/9019 342/25 D |
| 10,468,062 | B1 * | 11/2019 | Levinson | G01S 13/89 |
| 10,535,127 | B1 * | 1/2020 | Simonson | G01S 13/9027 |
| 10,698,104 | B1 * | 6/2020 | Simonson | G01S 13/9027 |
| 2009/0289837 | A1 * | 11/2009 | Nonaka | G01S 13/88 342/25 A |
| 2011/0222781 | A1 * | 9/2011 | Nguyen | G06K 9/6249 382/218 |
| 2017/0350974 | A1 * | 12/2017 | Korchev | G01S 13/9027 |
| 2018/0059238 | A1 * | 3/2018 | Stevens | G01S 13/9027 |
| 2018/0211128 | A1 * | 7/2018 | Hotson | G01S 13/931 |
| 2018/0372862 | A1 * | 12/2018 | Ni | G01S 13/9017 |
| 2019/0138830 | A1 * | 5/2019 | Justice | G06K 9/00771 |
| 2019/0204834 | A1 * | 7/2019 | Harrison | G01S 13/931 |
| 2021/0215818 | A1 * | 7/2021 | Kim | G01S 13/9029 |

* cited by examiner

*Primary Examiner* — Bernarr E Gregory
(74) *Attorney, Agent, or Firm* — Haynes and Boone, LLP

(57) ABSTRACT

A synthetic aperture radar (SAR) system is disclosed. The SAR comprises a memory, a convolutional neural network (CNN), a machine-readable medium on the memory, and a machine-readable medium on the memory. The machine-readable medium storing instructions that, when executed by the CNN, cause the SAR system to perform operations. The operation comprises: receiving range profile data associated with observed views of a scene; concatenating the range profile data with a template range profile data of the scene; and estimating registration parameters associated with the range profile data relative to the template range profile data to determine a deviation from the template range profile data.

20 Claims, 11 Drawing Sheets

| Layer (type) | Output Shape | Param # |
|---|---|---|
| input_1 (InputLayer) | (None, 182, 180, 2) | 0 |
| conv2d_1 (Conv2D) | (None, 182, 180, 16) | 304 |
| conv2d_2 (Conv2D) | (None, 182, 180, 16) | 2320 |
| max_pooling2d_1 (MaxPooling2 | (None, 91, 90, 16) | 0 |
| conv2d_3 (Conv2D) | (None, 91, 90, 16) | 2320 |
| conv2d_4 (Conv2D) | (None, 91, 90, 16) | 2320 |
| max_pooling2d_2 (MaxPooling2 | (None, 46, 45, 16) | 0 |
| conv2d_5 (Conv2D) | (None, 46, 45, 16) | 2320 |
| conv2d_6 (Conv2D) | (None, 46, 45, 16) | 2320 |
| max_pooling2d_3 (MaxPooling2 | (None, 23, 23, 16) | 0 |
| conv2d_7 (Conv2D) | (None, 23, 23, 16) | 2320 |
| conv2d_8 (Conv2D) | (None, 23, 23, 16) | 2320 |
| max_pooling2d_4 (MaxPooling2 | (None, 12, 12, 16) | 0 |
| conv2d_9 (Conv2D) | (None, 12, 12, 16) | 2320 |
| conv2d_10 (Conv2D) | (None, 12, 12, 16) | 2320 |
| max_pooling2d_5 (MaxPooling2 | (None, 6, 6, 16) | 0 |
| flatten_1 (Flatten) | (None, 576) | 0 |
| dense_1 (Dense) | (None, 256) | 147712 |
| dense_2 (Dense) | (None, 1) | 257 |

Total params: 169,153
Trainable params: 169,153
Non-trainable params: 0

FIG. 7

SYNTHETIC APERTURE RADAR (SAR) BASED CONVOLUTIONAL NAVIGATION

BACKGROUND

1. Field

The present disclosure is related to Synthetic Aperture Radar (SAR) mapping and registration, and more particularly, for example, to techniques for range profile-based SAR mapping and registration.

2. Prior Art

In some global positioning system (GPS) denied environments, navigation guidance is provided by synthetic aperture radar (SAR) imagery. In the field of SAR-based navigation systems, there is an ongoing effort to reduce computational complexity and required resources, particularly on autonomous platforms that have limited computational power.

Traditional SAR imagery navigation systems apply techniques developed in image processing for matching and registration of processed SAR images of a scene to expected ground landmarks of the same scene. In general, to achieve registration, image processing matching techniques typically attempt to detect salient features in each image, which can be tracked robustly though geometric transformations, such as image rotations, scaling, and translation.

Unfortunately, compared to optical images, SAR images exhibit various types of noise, such as glint and multiplicative speckle, which reduce the reliability of salient feature detection, which, in turn, reduces the likelihood of successful matching. Known techniques to utilize noise mitigation methods reduce the noise effect, but also tend to soften and wash out the features exploited by the image matching processes. Moreover, these known attempts add additional layers of expensive computations, which makes them ill-suited for low size, weight, and power (SWaP) autonomous systems.

As such, in relation to low SWaP autonomous systems, contemporary SAR-based navigation methods require extensive processing and data resources for SAR image reconstruction and feature detection which can present several challenges for SAR-based navigation on platforms, such as for example for systems with limited computational power and resources. Therefore, there is a need for a system and method that address these problems.

SUMMARY

A synthetic aperture radar (SAR) system is disclosed. The SAR comprises a memory, a convolutional neural network (CNN), a machine-readable medium on the memory, and a machine-readable medium on the memory. The machine-readable medium storing instructions that, when executed by the CNN, cause the SAR system to perform operations. The operation comprises: receiving range profile data associated with observed views of a scene; concatenating the range profile data with a template range profile data of the scene; and estimating registration parameters associated with the range profile data relative to the template range profile data to determine a deviation from the template range profile data.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 7 is a system block diagram of an example of an implementation of the CNN shown in FIG. 2 performing training in accordance with the present disclosure.

DETAILED DESCRIPTION

Figure 1A:
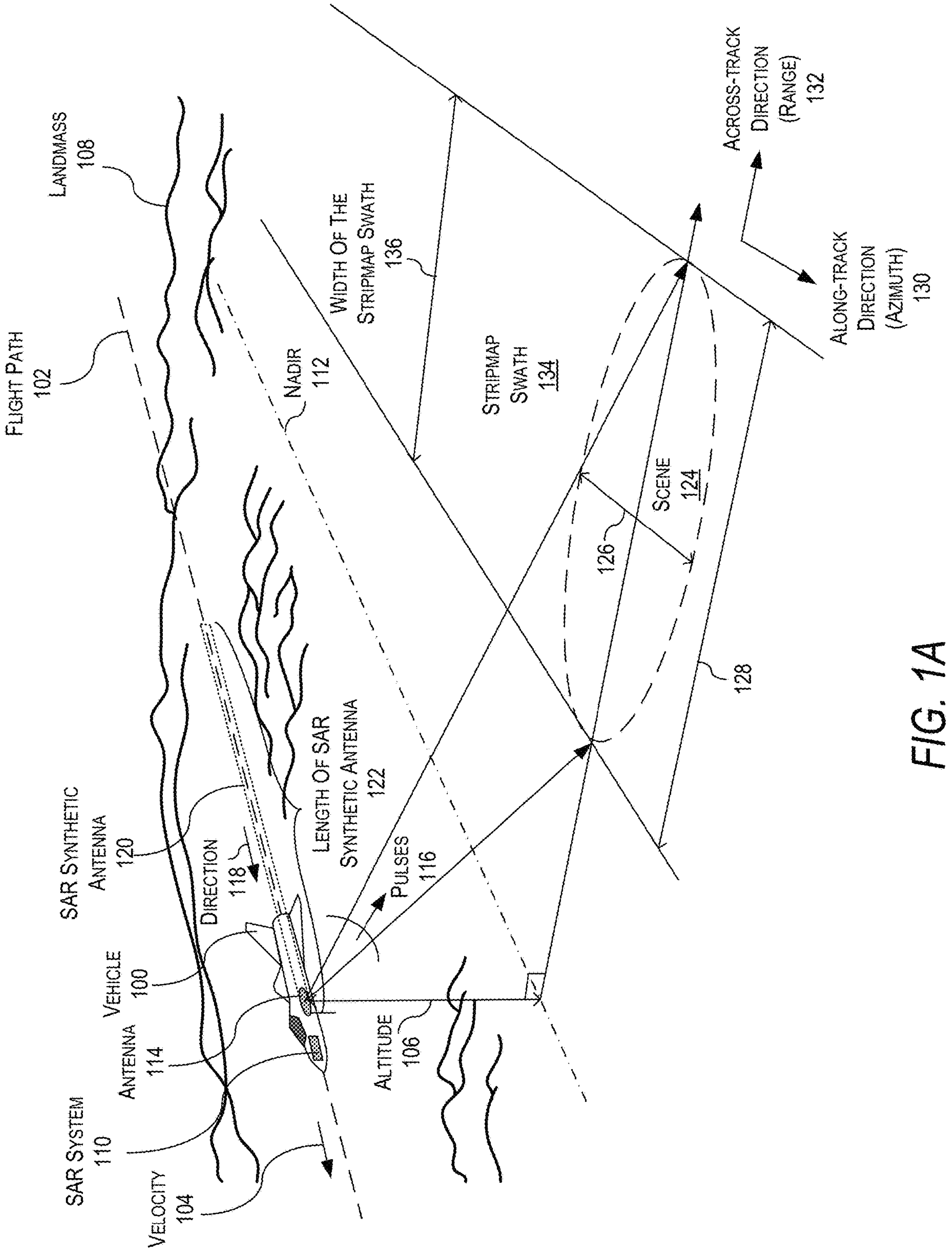
FIG. 1A is a perspective view of a diagram of an example of an implementation of a Synthetic Aperture Radar (SAR) system in a vehicle flying a course along a flight path over a landmass in accordance with the present disclosure.

A synthetic aperture radar (SAR) system is disclosed. The SAR comprises a memory, a convolutional neural network (CNN), a machine-readable medium on the memory, and a machine-readable medium on the memory. The machine-readable medium storing instructions that, when executed by the CNN, cause the SAR system to perform operations. The operation comprises: receiving range profile data associated with observed views of a scene; concatenating the range profile data with a template range profile data of the scene; and estimating registration parameters associated with the range profile data relative to the template range profile data to determine a deviation from the template range profile data.

Specifically, a SAR system on a vehicle is described. The SAR system may be a stripmap mode SAR system, spotlight mode SAR system, circular mode SAR system, or scan mode SAR system. As an example of a stripmap mode SAR system as described in the present disclosure, the SAR system comprises an antenna that is fixed and directed outward from the side of the vehicle, a SAR sensor, a storage, and a computing device. The computing device comprises a memory, CNN, and a machine-readable medium (also referred to as a "machine-readable media") on the memory. The machine-readable medium stores instructions that, when executed by the CNN, cause the SAR system to perform various operations. The operations comprise: receiving stripmap range profile data associated with observed views of a scene; transforming the received stripmap range profile data into partial circular range profile data; comparing the partial circular range profile data to a template range profile data of the scene; and estimating registration parameters associated with the partial circular range profile data relative to the template range profile data to determine a deviation from the template range profile data.

In general, the SAR system disclosed utilizes a method for performing matching and registration directly on SAR range profile data without requiring computationally intensive SAR image reconstruction and feature detection. The SAR system enables navigation based on registering and comparing the SAR range profile data with a pre-stored template. The SAR system utilizes the CNN to estimate the registration parameters via a learning-based approach that does not utilize an iterative solution during deployment of the SAR system. In this disclosure, the CNN is a deep convolutional neural network that performs registration in only a single forward pass through the CNN.

As such, the SAR system disclosed does not perform reconstruction of images from SAR data for image-based navigation and performs the navigation directly based on the acquired range-profile data. This approach greatly increases the robustness of the SAR-based registration to the existence of corner and out-of-view reflectors that introduce large errors for known SAR methods. This approach also does not use an iterative on-board optimization process to find the registration parameters.

As such, the SAR system disclosed reduces the computation, memory, and transmission bandwidth required of a conventional SAR-based navigation system. Unlike the SAR system disclosed, conventional SAR navigation systems typically utilize techniques that attempt to match salient features in multiple SAR images that may be easily detected and matched. As such, conventional SAR-based navigation systems generally construct multiple SAR images for use with these navigation techniques and, resultingly, require extensive computation resources, memory, and transmission bandwidth. The SAR system disclosed in the present disclosure does not need to perform any image reconstruction and, instead, utilizes a computationally less intensive processing method. The lighter computation load results in reduced size, weight, and power (SWaP).

It is appreciated by those of ordinary skill in the art that generally, a SAR is a coherent mostly airborne or spaceborne side-looking radar system ("SLAR") which utilizes the flight path of a moving platform (e.g., a vehicle such as, for example an aircraft or satellite), on which the SAR is located, to simulate an extremely large antenna or aperture electronically, and that generates high-resolution remote sensing imagery. SAR systems are used for terrain mapping and/or remote sensing using a relatively small antenna installed on the moving vehicle in the air.

Turning to FIG. 1A, a perspective view of a diagram of an example of an implementation of a SAR system in a vehicle 100 flying along a straight flight path 102 with a constant velocity 104 and at a constant altitude 106 over a landmass 108 in accordance with the present disclosure. The vehicle 100 (also known as a platform) may be, for example, a manned or unmanned aircraft such as an airplane, a drone, a spacecraft, a rotorcraft, or other type of unmanned or manned vehicle. The vehicle 100 flies along the flight path 102 at the constant altitude 106 such that a SAR system 110 (on the vehicle 100) is directly above a nadir 112. In this example, the nadir 112 is a locus of points on the surface of the Earth (e.g., the landmass 108) directly below an antenna 114 of the SAR system 110. It is appreciated by those of ordinary skill in the art that in radar systems the nadir 112 is the beginning of the range parameter of a SAR radar.

In an example of operation, the SAR system 110 radiates (e.g., transmits) SAR radar signal pulses 116 obliquely at an approximate normal (e.g., a right angle) direction to a direction 118 of the flight along the flight path 102. The SAR radar signal pulses 116 are electromagnetic waves that are sequentially transmitted from the antenna 114, which is a "real" physical antenna located on the vehicle 100. As an example, the SAR radar signal pulses 116 can be linear frequency modulated chip signals.

The antenna 114 is fixed and directed (e.g., aimed) outward from a side of the vehicle 100 at an obliquely and approximately normal direction to the side of the vehicle 100. The antenna 114 has a relatively small aperture size with a correspondingly small antenna length. As the vehicle 100 moves along the flight path 102, the stripmap SAR system synthesizes a SAR synthetic antenna 120 that has a synthesized length 122 that is much longer than the length of the real antenna 114. It is appreciated by those of ordinary skill in the art that the antenna 114 may optionally be directed in a non-normal direction from the side of the vehicle 100. In this example, the angle at which the fixed antenna 114 is aimed away from the side of the vehicle 100 (and resultingly the flight path 102) will be geometrically compensated in the computations of the SAR system 110.

As the SAR radar signal pulses 116 hit the landmass 108 they illuminate an observed scene 124 (also referred to as a "footprint," "parch," or "area") of the landmass 108 and scatter (e.g., reflect off the landmass 108). The illuminated scene 124 corresponds to a width 126 and 128 of the main beam of the real antenna 114 in an along-track direction 130 and across-track direction 132 as the main beam intercepts the landmass 108. In this example, the along-track direction 130 is parallel to the direction 118 of the flight path 102 of the vehicle 100 and it represents the azimuth dimension for the SAR system 110. Similarly, the across-track direction 132 is perpendicular (e.g., normal) to the flight path 102 of the vehicle 100 and it represents the range dimension of the SAR system. As the vehicle 100 travels along the flight path 102, the illuminated scene 124 defines a stripmap swath 134, having a swath width 136, which is a strip along the surface of the landmass 108 that has been illuminated by the illuminated scene 124 produced by the main beam of the antenna 114. In general, the length 122 of the SAR synthetic antenna 120 is directly proportional to the range 132 in that as the range 132 increases, the length 122 of the SAR synthetic antenna 120 increases.

Figure 1B:
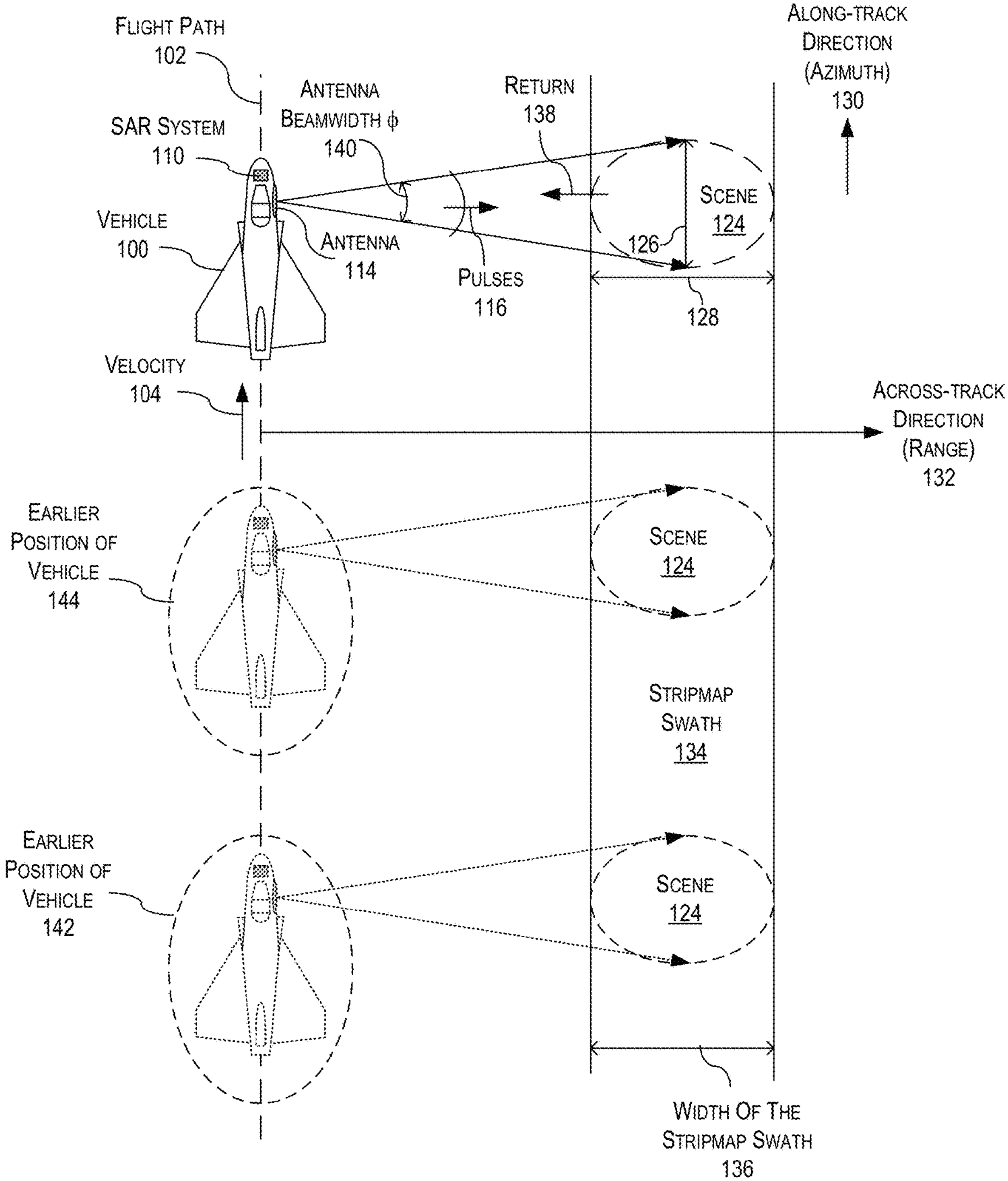
FIG. 1B is a top view of the stripmap SAR system in the vehicle shown in FIG. 1A in accordance with the present disclosure.

In FIG. 1B, a top view of the stripmap SAR system in the vehicle 100 is shown in accordance with the present disclosure. Again, the vehicle 100 is shown flying along the straight flight path 102 with a constant velocity 104. In operation, as the vehicle 100 flies along the flight path 102, the SAR system 110, through the antenna 114, radiates the SAR radar signal pulses 116 at the ground (e.g., landmass 108) at an approximately normal direction from the flight path 102 (and the along-track direction 130) where the SAR radar signal pulses 116 illuminate the scene 124 of the landmass 108 and scatter. The scatter off the scene 124 produces at least backscatter waves that are radar return signals 138 that have reflected off the landmass 108 and reflected back towards the antenna 114. The antenna 114 receives the radar return signals 138 and passes them to the SAR system 110 that processes the radar return signals 138. In this example, the processing may include recording and storing the radar return signals 138 in a storage (not shown) in a data grid structure. The SAR system 110 utilizes consecutive time intervals of radar transmission and reception to receive radar phase history data of the illuminated and observed scene (e.g., scene 124) at different positions along the flight path 102. Normally, the processing the combination of raw radar data (e.g., radar phase history data of illuminated scene) enables the construction of a SAR image (e.g., a high-resolution SAR image) of the captured scene (e.g., scene 124). However, the disclosed SAR system 110 obviates the need for the construction of SAR images in order to perform a navigation task, instead, the SAR system 110 estimates the geometric transformation parameters directly from the range profiles of the received phase history data and phase history template data.

In this example, the widths 126 and 128 of the main beam of the antenna 114 are related to the antenna beamwidth ϕ 140 of the main beam produced by the antenna 114. Additionally, in this example, the vehicle 100 is shown to have traveled along the flight path 102 scanning the stripmap swath 134 at different positions along the flight path 102, where, as an example, the SAR system 110 is shown to have scanned two earlier scenes 142 and 144 the stripmap switch 134 at two earlier positions 146 and 148 along the flight path 102.

It is appreciated by those of ordinary skill in the art that while the example vehicle 100 shown in FIGS. 1A and 1B is a manned aircraft, this is for illustrative purpose only and the vehicle 100 may also be an unmanned aircraft such as an unmanned aerial vehicle (UAV) or drone.

Figure 2:
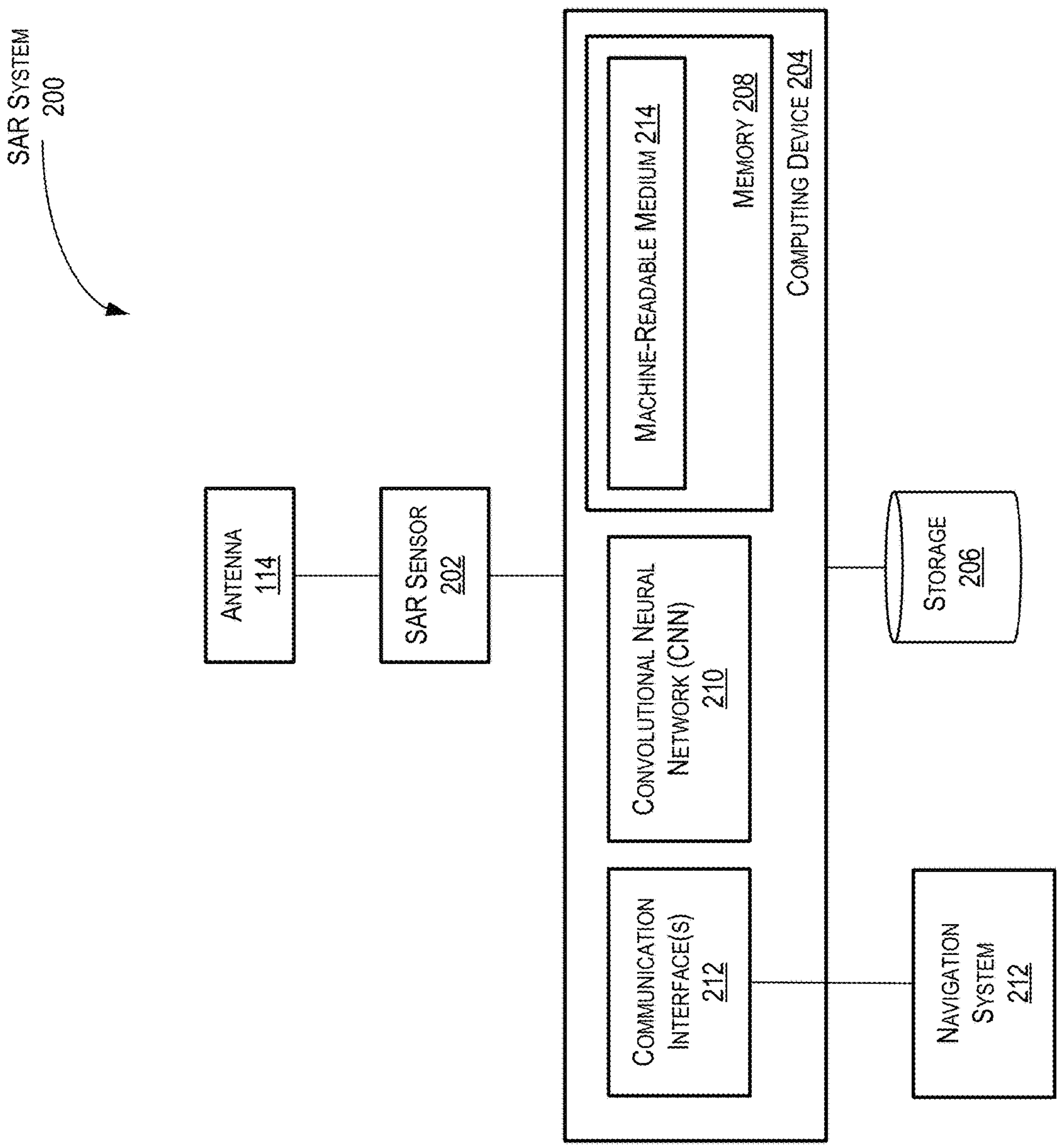
FIG. 2 is a system block diagram of an example of an implementation of the SAR system, shown in FIGS. 1A and 1B, in accordance with the present disclosure.

In FIG. 2, a system block diagram of an example of an implementation of the SAR system 200 is shown in accordance with the present disclosure. In this example, the SAR system 200 includes the antenna 114, a SAR sensor 202, a computing device 204, and a storage 206. The computing device 204 includes a memory 208, CNN 210, and a one or more communication interfaces 212. In this example, the machine-readable medium 214 is on the memory 208 and stores instructions that, when executed by the CNN 210, cause the SAR system 200 to perform various operations. The operations comprise: receiving range profile data associated with observed views of a scene; concatenating the range profile data with a template range profile data of the scene (e.g., scene 124); and estimating registration parameters associated with the range profile data relative to the template range profile data to determine a deviation from the template range profile data.

In general, the SAR system 200 is utilized to capture and process phase history data from observation views, of the scene(s) 124 in the stripmap swath 134, in accordance with various techniques described in the present disclosure. The SAR system is generally a SAR navigation guidance system that comprises a SAR radar device that transmits and receives electromagnetic radiation and provides representative data in the form of raw radar phase history data. As an example, the SAR system 200 is implemented to transmit and receive radar energy pulses in one or more frequency ranges from less than one gigahertz to greater than sixteen gigahertz based on a given application for the SAR system 200.

In this example, the computing device 204 includes the CNN 210 to execute instructions to perform any of the various operations described in the present disclosure. The CNN 210 is adapted to interface and communicate with the memory 208 and SAR sensor 202 via the one or more communication interfaces 212 to perform method and processing steps as described herein. The one or more communication interfaces 212 include wired or wireless communication buses within the vehicle 100.

The CNN 210 is a class of deep neural networks that include multiple layers of connected artificial neurons that utilizes convolution as a linear operation on the artificial neurons in different layers. In general, the CNN 210 is a type of neural network that includes a set of algorithms, modeled loosely after the human brain, that are designed to recognize patterns. The CNN 210 is configured to interpret sensory data through a type of machine perception, labeling or clustering raw input data. As a result, the CNN 210 is configured to cluster and classify stored and managed data to group unlabeled data according to similarities among example inputs. The CNN 210 is configured to learn and train from the inputs.

As an example of operation, the CNN 210 is configured to perform a method that includes: receiving range profile data associated with observed views of the scene; concatenating the range profile data with the template range profile data of the scene (e.g., scene 124); and estimating registration parameters associated with the range profile data relative to the template range profile data to determine the deviation from the template range profile data. In this example, the method step of estimating the registration parameters may comprise regressing over the concatenated data with the CNN 210 to predict the registration parameters, wherein the concatenated data forms an image with two channels that is regressed by the CNN 210. The range profile data is a two-dimensional array.

The CNN 210 is trained by a sub-method that comprises: synthesizing a synthesized template range profile data of a simulated scene; synthesizing a synthesized observed range profile data of the simulated scene with random registration parameters; concatenating the synthesized observed range profile data with the synthesized template range profile data to faun concatenated synthesized data; feeding the concatenated synthesized data to the CNN 210; estimating simulated registration parameters associated with the concatenated synthesized data; running a backpropagation on a difference between the predicted registration parameters and the simulated parameters; and updating the CNN 210 with the backpropagation. The predicted registration parameters are predicted based on the synthesized template range profile data and the synthesized observed range profile data of the simulated scene. The registration parameters comprise one of a rotation angle, an x,y translation, or a scaling of the range profile data relative to the template range profile data. The template range profile data comprises a plurality of projection angles of the scene, and the receiving the range profile data further comprises receiving the range profile data comprising a subset of the plurality of projection angles of the scene.

The method performed by the CNN 210 may further comprise: receiving synthetic aperture radar phase history data of the observed views of the scene from a spotlight mode synthetic aperture radar sensor; and applying a radon transform to the synthetic aperture radar phase history data to generate the range profile data. Moreover, the method performed by the CNN 210 may further comprise: storing the template range profile data in a memory; and updating a synthetic aperture radar navigation based on the deviation from the template range profile data.

In various examples, it is appreciated by those of ordinary skill in the art that the processing operations and/or instructions are integrated in software and/or hardware as part of the CNN 210, or code (e.g., software or configuration data), which is stored in the memory 214. The examples of processing operations and/or instructions disclosed in the present disclosure are stored by the machine-readable medium 213 in a non-transitory manner (e.g., a memory 208, a hard drive, a compact disk, a digital video disk, or a flash memory) to be executed by the CNN 210 to perform various methods disclosed herein. In this example, the machine-readable medium 214 is shown as residing in memory 208 within the computing devices 204 but it is appreciated by those of ordinary skill that the machine-readable medium 214 may be located on other memory external to the computing device 204, such as for example, the storage 206. As another example, the machine-readable medium 213 may be included as part of the CNN 210.

As an example, the CNN 210 may be implemented as a small, lightweight, and low-power board type of computation device that may perform navigation in near real-time. For example, the CNN 210 may be implemented on 5 by 5-inch circuit board, weighing approximately 120 grams, and having a power utilization of less than approximately 10 Watts that produces approximately 5 to 10 corrections per second. Moreover, the CNN 210 may be implemented, for example, on an NVIDA Tegra® K1 board produced by Nvidia Corporation of Santa Clara, Calif.

In this example, the memory 208 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. The memory 208 may include one or more memory devices within the computing device 204 and/or one or more memory devices located external to the computing device 204. The CNN 210 is adapted to execute software stored in the memory 208 to perform various methods, processes, and operations in a manner as described herein. In this example, the memory 208 stores the received phase history data of a scene 124 and/or phase history template data of the same scene 124.

The SAR sensor 202 is utilized to transmit electromagnetic waves (e.g., SAR radar signal pulses 116) and receive backscattered waves (e.g., received phase history data from the radar return signals 138) of scene 124. In this example, the SAR sensor 202 includes a radar transmitter to produce the SAR radar signal pulses 116 that are provided to an antenna 114 and radiated in space toward scene 124 by antenna 114 as electromagnetic waves. The SAR sensor 202 further includes a radar receiver to receive backscattered waves (e.g., radar return signals 138) from antenna 114. The radar return signals 138 are received by SAR sensor 202 as received phase history data of the scene 124. The SAR sensor 202 communicates the received phase history data to the CNN 210 and/or memory 208 via the one or more communication interfaces 212.

The antenna 114 is implemented to both transmit electromagnetic waves (e.g., SAR radar signal pulses 116) and receive backscattered waves (e.g., radar return signals 138). In this example, the antenna 114 is in a fixed position on the vehicle 100 and is directed outward from the side of the vehicle 100 since the SAR system 200 is operating as a side-looking radar system. The antenna 114 may be implemented as phased-array antenna, horn type of antenna, parabolic antenna, or other type of antenna with high directivity.

The storage 206 may be a memory such as, for example, volatile and non-volatile memory devices, such as RAM, ROM, EEPROM, flash memory, or other types of memory, or a removable storage device such as, for example, hard drive, a compact disk, a digital video disk. The storage 206 may be utilized to store template range profile data of the scenes.

Figure 3:
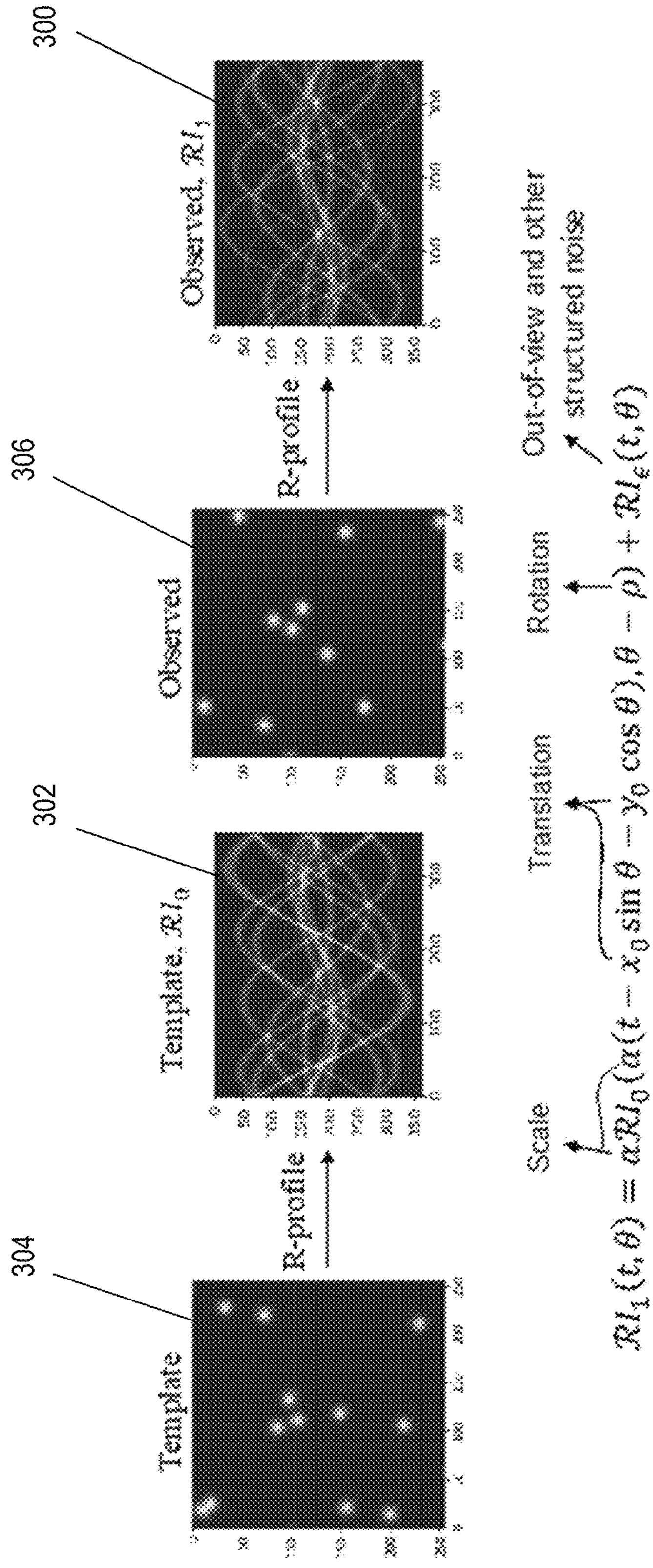
FIG. 3 includes graphical depictions of an example of an observed range-profile and template range-profile with associated observed image and template image and the mathematical relationship between them in accordance with the present disclosure.

In an example of operation, the SAR system 200 is configured to find the registration parameters that match an observed range-profile data 300 to a template range-profile data 302. In general, the relationship between the observed range-profile data 300 and template range-profile data 302 is shown in FIG. 3. In FIG. 3, graphical depictions of an example of an observed range-profile data 300 and template range-profile data 302 are shown with associated observed image 304 and template image 306 and the mathematical relationship between them in accordance with the present disclosure. In this example, the observed range-profile data 300 is a Radon transform of the observed image 304 and the template range-profile data 302 is a Radon transform of the template image 306. In this example, typical geometric transformations that are needed to match an observed image with a template, namely rotation, translation, and scaling, have mathematically traceable counterparts in Radon space, where an image space operation of rotation of ρ degrees corresponds to a Radon space of J(t, θ−ρ). Similarly, an image space operation of translation by $(x_0, y_0)$ corresponds to a Radon space of $J(t-x_0 \cos\theta - y_0 \cos\theta)$. Moreover, an image space operation of scaling by a value a corresponds to a Radon space of αJ(αt, θ).

As such, if two images $I_1$ and $I_0$ are related to each other via a set of these three transformations, then their Radon transforms are related to each other according to relationship $$J_1=\alpha J_0(\alpha(t-x_0\cos\theta-y_0\sin\theta),\theta-\rho).$$

This allows the method of the present disclosure to estimate the registration parameters α, $(x_0, y_0)$ and ρ directly in Radon space, specifically in range profile space, bypassing any image reconstruction process. In general, the registration is achieved between a pre-stored range-profile template $J_0$ (e.g., template range-profile data data 302) and observed range-profiles $J_1$ (e.g., observed range-profile data 300). However, noise and out-of-view reflectors will affect this process. Specifically, a structured noise term, $RI_\epsilon$, which models the out-of-view and jamming reflectors is unknown and therefore the process for finding the registration parameters needs to also estimate the unknown $RI_\epsilon$. As such, the previous relationship may be re-written to include noise terms as $$RI_1(t,\theta)=\alpha RI_0(\alpha(t-x_0\sin\theta-y_0\cos\theta),\theta-\varphi+RI_\epsilon(t,\theta).$$

In this relationship, the α represents the scale, the $x_0 \sin\theta - y_0 \cos\theta$ represents the translation, ρ represents the rotation, and $RI_\epsilon(t, \theta)$ represents the out-of-view and other structured noise. This introduces a theoretical and computational challenge. Approaches in the past have attempted to utilize expectation-maximization (EM) likelihood approaches, in which one alternates between estimating the registration parameters and estimating the unknown structured noise, $RI_\epsilon$. Unfortunately, this introduces a computationally expensive optimization, which requires many iterations to be solved. As such, this is not desirable when a near real-time performance is needed.

In general, the problem is to find a function $f$ such that $f(RI_1,RI_0)=[x_0,y_0,\rho,\alpha]^T$. To solve this problem, the present disclosure utilizes parametric approach where a parametric function, $f(RI_1,RI_0|\Gamma)$, with $\Gamma$ being the parameters that regresses over $RI_0$ and $RI_1$ to predict the registration parameters. Specifically, the SAR system 200 is configured to learn a mapping defined on the space of $RI_0 \times RI_1$ to the four (4)-dimensional space of registration parameters $[x_0,y_0,\rho,\alpha] \in \mathbb{R}^4$. As such, the $f(\mathcal{R} I_0,\mathcal{R} I_1|\Gamma)$ is utilized as the CNN 210, which is configured to receive $RI_1$ and $RI_0$ and perform a regression to find the rotation parameter, $\rho$.

Figure 4B:
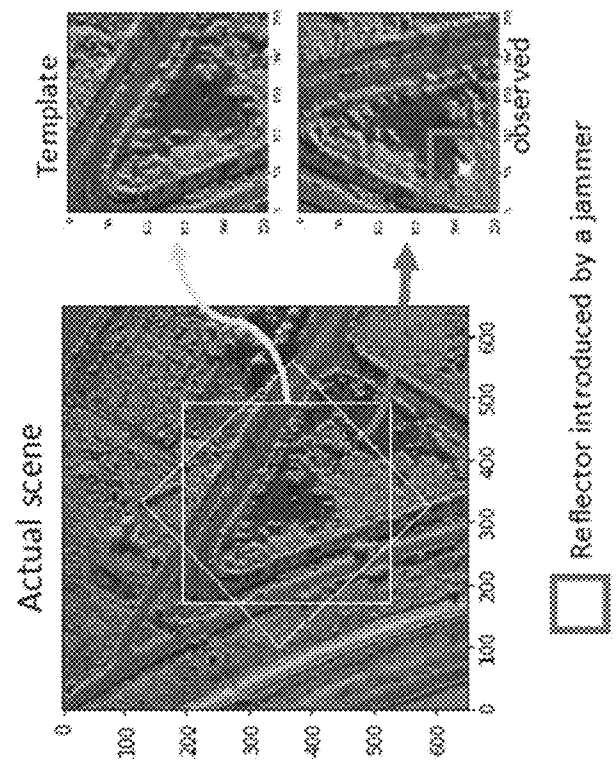
FIG. 4B is a graphical depiction of an actual scene with reflectors introduced by a jammer in accordance with the present disclosure.
Figure 4A:
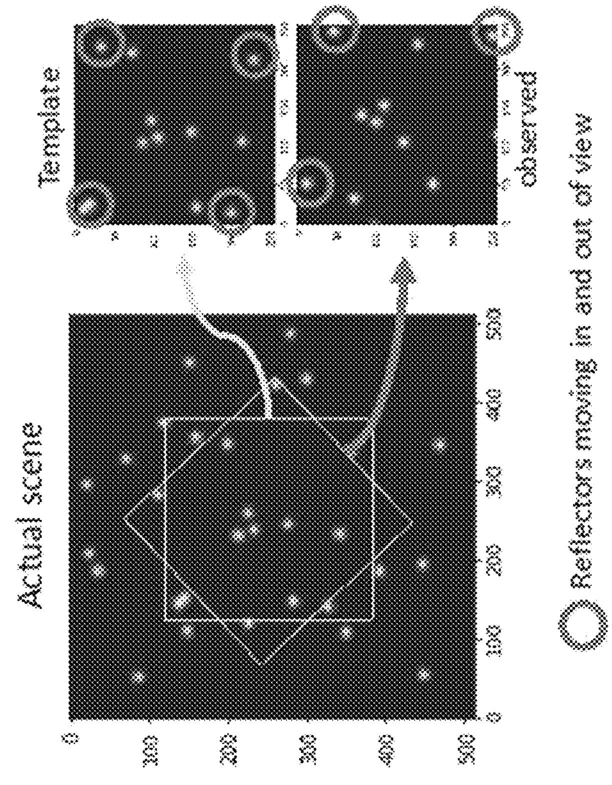
FIG. 4A is a graphical depiction of an actual scene with reflectors moving in and out of view in accordance with the present disclosure.

In FIG. 4A, a graphical depiction is shown of an actual scene with reflectors moving in and out of view in accordance with the present disclosure. Similarly, in FIG. 4B, a graphical depiction is shown of an actual scene with reflectors introduced by a jammer in accordance with the present disclosure.

Figure 5:
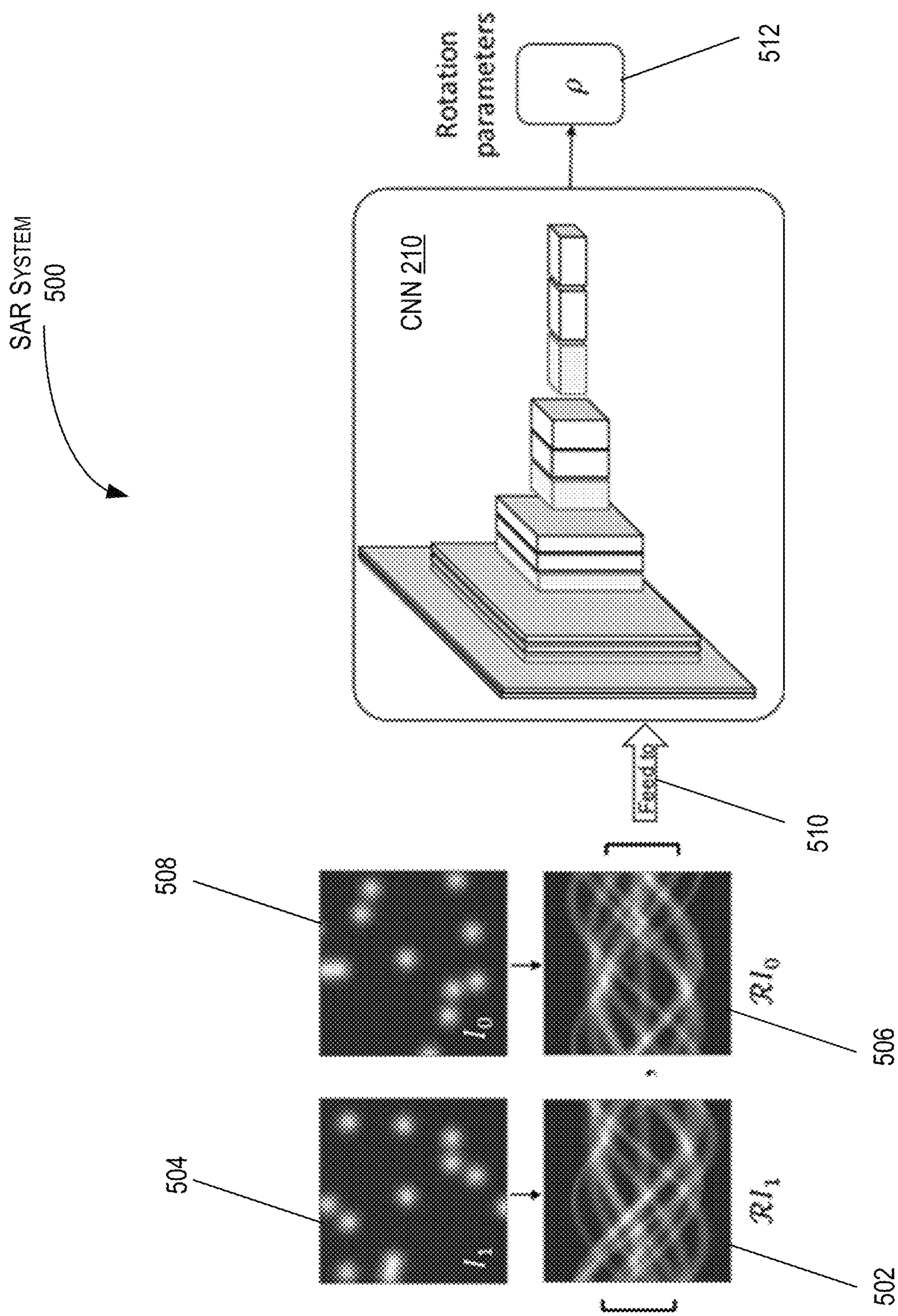
FIG. 5 is a system block diagram of an example of an implementation of a system level architecture for the SAR system shown if FIG. 2 in accordance with the present disclosure.

Turning to FIG. 5, a system block diagram of an example of an implementation of system level architecture for the SAR system 500 is shown in accordance with the present disclosure. In this example, the CNN 210 receives an observed range-profile $RI_1$ 502 (corresponding to an observed scene 504) and a template range-profile $RI_0$ 506 (corresponding to a template image 508). The observed range-profile $RI_1$ 502 and the template range-profile $RI_0$ 506 are concatenated into concatenated data 510 that is input into the CNN 210. The concatenated data 510 forms an image with two channels that is configured to be regressed by the CNN 210. The CNN 210 then regresses over the concatenated data to predict the registration parameters such as, for example, the rotation parameters $\rho$ 512.

Figure 6:
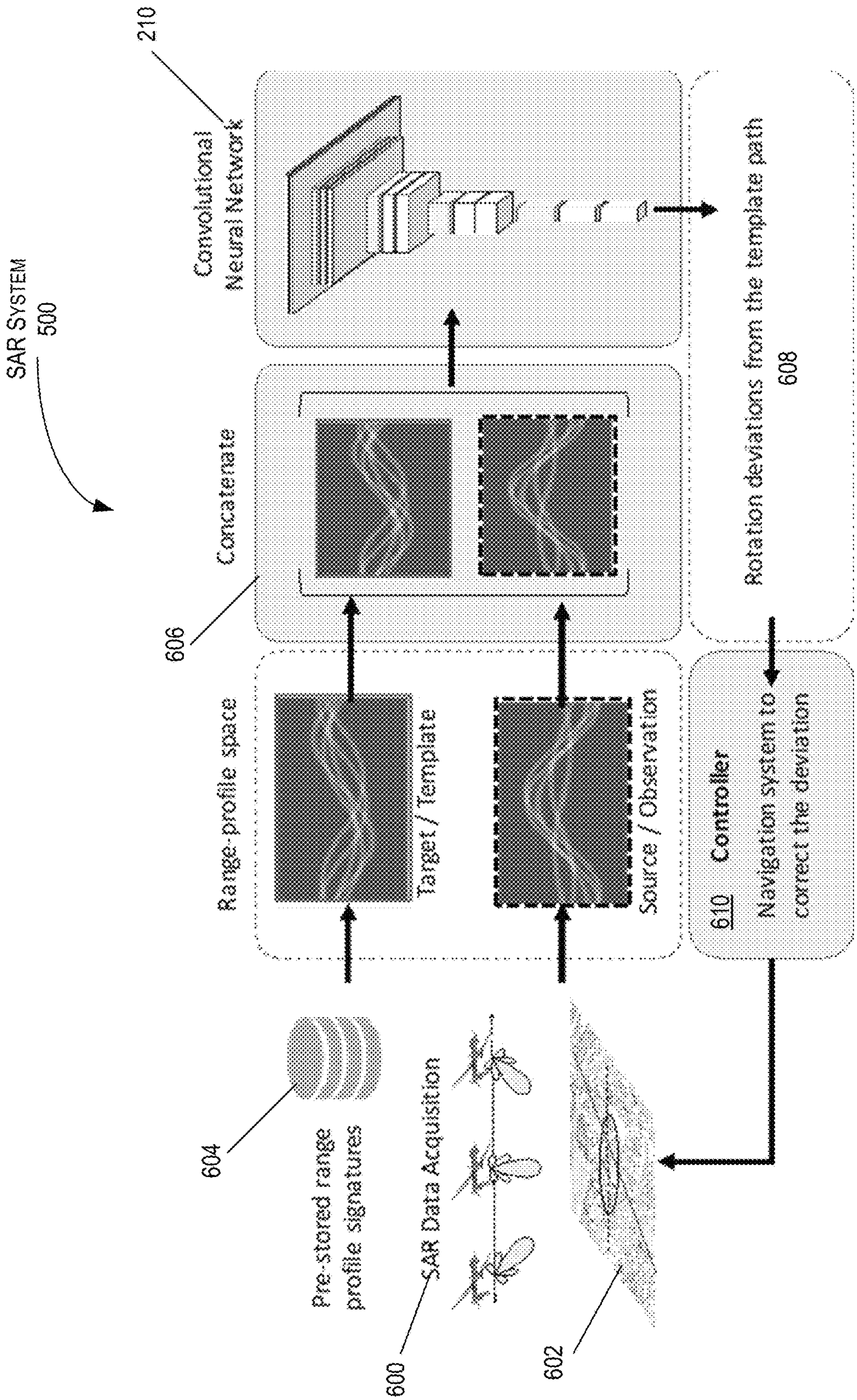
FIG. 6 is an example of an implementation of an architecture for the SAR system in accordance with the present disclosure.

In FIG. 6, a system block diagram is shown of an example of another implementation of the SAR system 500 in accordance with the present disclosure. In this example, the SAR system 500 receives SAR data acquisition 600 of a scene 602 and pre-stored range profile signatures 604. The SAR system 500 produces the observed range-profile data 300 from the SAR data acquisition 600 and retrieves the template range-profile data 302 from the pre-stored range profile signatures 604. The observed range-profile data 300 and the template range-profile data 302 are concatenated 606 and input into the CNN 210. The CNN 210 then produces the rotation deviations from the template path 608 that is passed to a controller 610 that is part of a navigation system that is configured to correct any deviation in the travel path of the SAR system 500.

In FIG. 7, an example of an implementation of an architecture for the CNN 210 is shown in accordance with the present disclosure. The architecture for the CNN 210 is based on the range-profile data being a two-dimensional array of size 182 by 180. The concatenated template and observed range-profile data form an image with two-channels having a size of 182 by 180 by 2. The total number of parameters shown in this example are 169,153 with trainable parameters being 169 and 153.

Figure 8:
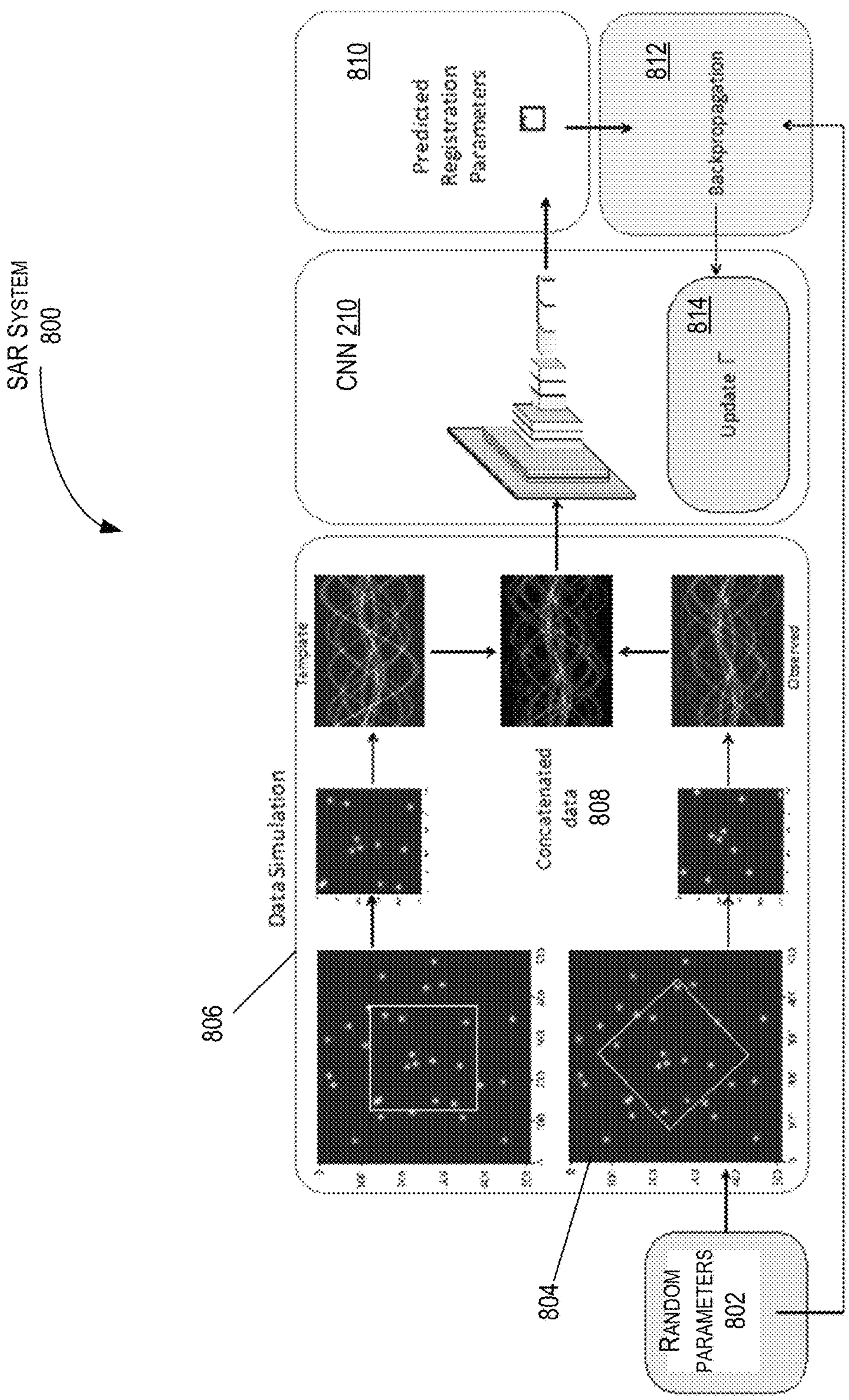
FIG. 8 is a system block diagram is shown of an example of an implementation of the SAR system, shown in FIG. 6, performing training in accordance with the present disclosure.
Figure 9:
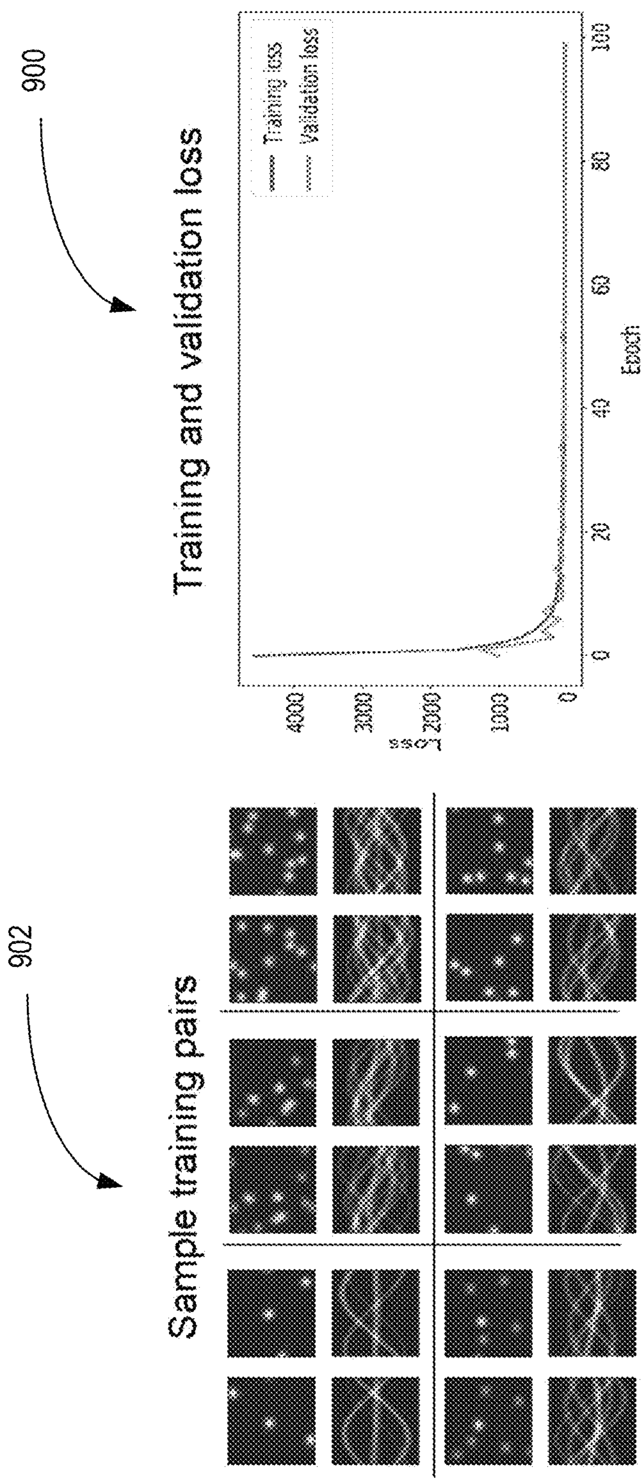
FIG. 9 shows plots of the training and validation losses in accordance with the present disclosure.

Turning to FIG. 8, a system block diagram is shown of an example of an implementation of the SAR system 800 performing training in accordance with the present disclosure. In this example, the random registration parameters 6802 are utilized to synthesize range-profile data 804 in a data simulation 806 stage. The synthesized range-profile data 804 is concatenated with a template to form the concatenated data 808 that is input into the CNN 210. The CNN 210 then produces the predicted registration parameters 810. The SAR system 800 then runs backpropagation 812 on the difference between the predicted registration parameters 810 and the ground truth (i.e. the randomly generated parameters 802 used in the simulation). The SAR system 800 then updates 814 the CNN 210. In FIG. 9, plots of the resulting training and validation losses 900 are shown in accordance with the present disclosure. The training and validation losses 900 are based on the sampled training pairs 902 shown.

Figure 10:
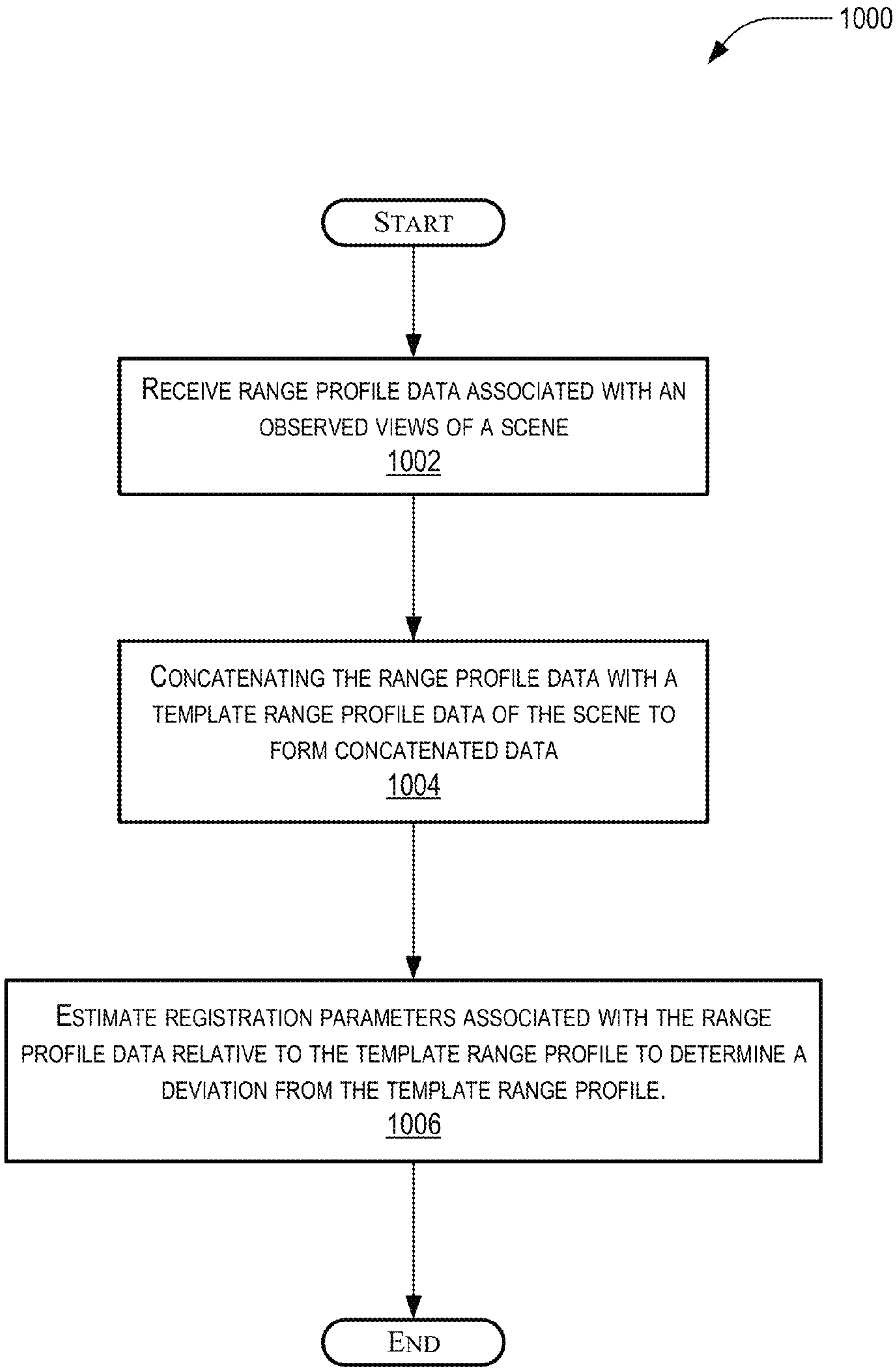
FIG. 10 is a flowchart of an example of an implementation of the method performed by the SAR system, shown in FIG. 2, in accordance with the present disclosure.

In FIG. 10, a flowchart of a method 1000 performed by the SAR system is shown in accordance with the present disclosure. The method 1000 starts by receiving 1002 the range profile data associated with observed views of a scene. The range profile data comprises information captured via the SAR system. The method 1000 then includes concatenating 1004 the range profile data with the template range profile data of the scene to form concatenated data. The method 1000 then estimates 1006 the registration parameters associated with the range profile data relative to the template range profile data with the CNN to determine the deviation from the template range profile data. The method then ends.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

Further, the disclosure comprises embodiments according to the following clauses.

Clause 1. A method comprising: receiving range profile data associated with observed views of a scene, wherein the range profile data comprises information captured via a synthetic aperture radar (SAR); concatenating the range profile data with a template range profile data of the scene to form concatenated data; and estimating registration parameters associated with the range profile data relative to the template range profile data with a convolutional neural network (CNN) to determine a deviation from the template range profile data.

Clause 2. The method of clause 1, wherein estimating the registration parameters comprises regressing over the concatenated data with the CNN to predict the registration parameters, wherein the concatenated data forms an image with two channels that is regressed by the CNN.

Clause 3. The method of clause 1 or 2, wherein the range profile data is a two-dimensional array.

Clause 4. The method of clause 1, 2, or 3, wherein the CNN is trained by a sub-method that comprises: synthesizing a synthesized template range profile data of a simulated scene; synthesizing a synthesized observed range profile data of the simulated scene with random registration parameters; concatenating the synthesized observed range profile data with the synthesized template range profile data to form concatenated synthesized data; feeding the concatenated synthesized data to the CNN; estimating simulated registration parameters associated with the concatenated synthesized data; running a backpropagation on a difference between the predicted registration parameters and the simulated parameters; and updating the CNN with the backpropagation.

Clause 5. The method of clause 1, 2, 3, or 4, wherein the predicted registration parameters are predicted based on the synthesized template range profile data and the synthesized observed range profile data of the simulated scene.

Clause 6. The method of clause 1, 2, 3, 4, or 5, wherein the registration parameters comprise one of a rotation angle, an x,y translation, or a scaling of the range profile data relative to the template range profile data.

Clause 7. The method of 1, 2, 3, 4, or 5, wherein the template range profile data comprises a plurality of projection angles of the scene, and the receiving the range profile data further comprises receiving the range profile data comprising a subset of the plurality of projection angles of the scene.

Clause 8. The method of 1, 2, 3, 4, or 5, further comprising: receiving synthetic aperture radar phase history data of the observed views of the scene from a spotlight mode synthetic aperture radar sensor; and applying a radon transform to the synthetic aperture radar phase history data to generate the range profile data.

Clause 9. The method of 1, 2, 3, or 4, further comprising: storing the template range profile data in a memory; and updating a synthetic aperture radar navigation based on the deviation from the template range profile data.

Clause 10. An aerial vehicle configured to perform the method of claim 1, the aerial vehicle comprising: a memory comprising a plurality of executable instructions and adapted to store template range profile data; the SAR; and one or more processors configured as the CNN for executing the plurality of instructions to perform the method of clause 1.

Clause 11. A synthetic aperture radar (SAR) system comprising: a memory; a convolutional neural network (CNN); a machine-readable medium on the memory, the machine-readable medium storing instructions that, when executed by the CNN, cause the SAR system to perform operations comprising: receiving range profile data associated with observed views of a scene; concatenating the range profile data with a template range profile data of the scene; and estimating registration parameters associated with the range profile data relative to the template range profile data to determine a deviation from the template range profile data.

Clause 12. The SAR of clause 11, wherein estimating the registration parameters comprises regressing over the concatenated data with the CNN to predict the registration parameters, wherein the range profile data is a two-dimensional array and the concatenated data forms an image with two channels that is regressed by the CNN.

Clause 13. The SAR of clause 11 or 12, wherein the CNN is trained by a sub-method that comprises: synthesizing template range profile data of a simulated scene; synthesizing observed range profile data of the simulated scene with random registration parameters; concatenating the synthesized range profile data with the synthesized template range profile data to form concatenated synthesized data; feeding the concatenated synthesized data to the CNN; estimating simulated registration parameters associated with the concatenated synthesized data; running a backpropagation on a difference between the predicted registration parameters and the simulated parameters; and updating the CNN with the backpropagation.

Clause 14. The SAR system of clause 11, 12, or 13, wherein the registration parameters comprise one of a rotation angle, an x,y translation, or a scaling of the range profile data relative to the template range profile data.

Clause 15. The SAR system of clause 11, 12, or 13, wherein the template range profile data comprises a plurality of projection angles of the scene, and the receiving further comprises receiving the range profile data comprising a subset of the plurality of projection angles of the scene.

Clause 16. The SAR system of clause 11, 12, or 13, further comprising: receiving synthetic aperture radar phase history data of the observed views of the scene from a spotlight mode synthetic aperture radar sensor; and applying a radon transform to the synthetic aperture radar phase history data to generate the range profile data.

Clause 17. The SAR system of clause 11, 12, 13, 14, 15, or 16, further comprising: storing the template range profile data in a memory; and updating a synthetic aperture radar navigation based on the deviation from the template range profile data.

Clause 18. A synthetic aperture radar (SAR) system on a vehicle, the SAR system comprising: an antenna that is fixed and directed outward from a side of the vehicle; a SAR sensor; a storage; and a computing device, wherein the computing device comprises a memory; a convolutional neural network (CNN); a machine-readable medium on the memory, the machine-readable medium storing instructions that, when executed by the CNN, cause the SAR system to perform operations comprising: receiving range profile data associated with observed views of a scene; concatenating the range profile data with a temple range profile data of the scene; and estimating registration parameters associated with the range profile data relative to the template range profile data to determine a deviation from the template range profile data.

Clause 19. The SAR of clause 18, wherein estimating the registration parameters comprises regressing over the concatenated data with the CNN to predict the registration parameters, wherein the range profile data is a two-dimensional array and the concatenated data forms an image with two channels that is regressed by the CNN.

Clause 20. The SAR of clause 18 or 19, wherein the CNN is trained by a sub-method that comprises: synthesizing template range profile data of a simulated scene; synthesizing observed range profile data of the simulated scene with random registration parameters; concatenating the synthesized range profile data with the synthesized template range profile data to form concatenated synthesized data; feeding the concatenated synthesized data to the CNN; estimating simulated registration parameters associated with the concatenated synthesized data; running a backpropagation on a difference between the predicted registration parameters and the simulated parameters; and updating the CNN with the backpropagation.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Moreover, the operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable medium that, when executed by one or more processing units, enable the one or more processing units to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

The invention claimed is:

1. A method comprising:

receiving range profile data associated with observed views of a scene, wherein the range profile data comprises information captured via a synthetic aperture radar (SAR);

concatenating the range profile data with a template range profile data of the scene to form concatenated data; and estimating registration parameters associated with the range profile data relative to the template range profile data with a convolutional neural network (CNN) to determine a deviation from the template range profile data.

2. The method of claim 1, wherein estimating the registration parameters comprises regressing over the concatenated data with the CNN to predict the registration parameters, wherein the concatenated data forms an image with two channels that is regressed by the CNN.

3. The method of claim 2, wherein the range profile data is a two-dimensional array.

4. The method of claim 3, wherein the CNN is trained by a sub-method that comprises:

synthesizing a synthesized template range profile data of a simulated scene;

synthesizing a synthesized observed range profile data of the simulated scene with random registration parameters;

concatenating the synthesized observed range profile data with the synthesized template range profile data to form concatenated synthesized data;

feeding the concatenated synthesized data to the CNN;

estimating simulated registration parameters associated with the concatenated synthesized data;

running a backpropagation on a difference between the predicted registration parameters and the simulated parameters; and updating the CNN with the backpropagation.

5. The method of claim 4, wherein the predicted registration parameters are predicted based on the synthesized template range profile data and the synthesized observed range profile data of the simulated scene.

6. The method of claim 4, further comprising:

storing the template range profile data in a memory; and updating a synthetic aperture radar navigation based on the deviation from the template range profile data.

7. The method of claim 1, wherein the registration parameters comprise one of a rotation angle, an x,y translation, or a scaling of the range profile data relative to the template range profile data.

8. The method of claim 1, wherein the template range profile data comprises a plurality of projection angles of the scene, and the receiving the range profile data further comprises receiving the range profile data comprising a subset of the plurality of projection angles of the scene.

9. The method of claim 1, further comprising:

receiving synthetic aperture radar phase history data of the observed views of the scene from a spotlight mode synthetic aperture radar sensor; and applying a radon transform to the synthetic aperture radar phase history data to generate the range profile data.

10. An aerial vehicle configured to perform the method of claim 1, the aerial vehicle comprising:

a memory comprising a plurality of executable instructions and adapted to store template range profile data;

the SAR; and one or more processors configured as the CNN for executing the plurality of instructions to perform the method of claim 1.

11. A synthetic aperture radar (SAR) system comprising:

a memory;

a convolutional neural network (CNN);

a machine-readable medium on the memory, the machine-readable medium storing instructions that, when executed by the CNN, cause the SAR system to perform operations comprising:

receiving range profile data associated with observed views of a scene;

concatenating the range profile data with a template range profile data of the scene; and estimating registration parameters associated with the range profile data relative to the template range profile data to determine a deviation from the template range profile data.

12. The SAR of claim 11, wherein estimating the registration parameters comprises regressing over the concatenated data with the CNN to predict the registration parameters, wherein the range profile data is a two-dimensional array and the concatenated data forms an image with two channels that is regressed by the CNN.

13. The SAR of claim 12, wherein the CNN is trained by a sub-method that comprises:

synthesizing template range profile data of a simulated scene;

synthesizing observed range profile data of the simulated scene with random registration parameters;

concatenating the synthesized range profile data with the synthesized template range profile data to form concatenated synthesized data;

feeding the concatenated synthesized data to the CNN;

estimating simulated registration parameters associated with the concatenated synthesized data;

running a backpropagation on a difference between the predicted registration parameters and the simulated parameters; and updating the CNN with the backpropagation.

14. The SAR system of claim 13, wherein the registration parameters comprise one of a rotation angle, an x,y translation, or a scaling of the range profile data relative to the template range profile data.

15. The SAR system of claim 13, wherein the template range profile data comprises a plurality of projection angles of the scene, and the receiving further comprises receiving the range profile data comprising a subset of the plurality of projection angles of the scene.

16. The SAR system of claim 13, further comprising:

receiving synthetic aperture radar phase history data of the observed views of the scene from a spotlight mode synthetic aperture radar sensor; and applying a radon transform to the synthetic aperture radar phase history data to generate the range profile data.

17. The SAR system of claim 16, further comprising:

storing the template range profile data in a memory; and updating a synthetic aperture radar navigation based on the deviation from the template range profile data.

18. A synthetic aperture radar (SAR) system on a vehicle, the SAR system comprising:

an antenna that is fixed and directed outward from a side of the vehicle;

a SAR sensor;

a storage; and a computing device, wherein the computing device comprises a memory;

a convolutional neural network (CNN);

a machine-readable medium on the memory, the machine-readable medium storing instructions that, when executed by the CNN, cause the SAR system to perform operations comprising:

receiving range profile data associated with observed views of a scene;

concatenating the range profile data with a temple range profile data of the scene; and estimating registration parameters associated with the range profile data relative to the template range profile data to determine a deviation from the template range profile data.

19. The SAR of claim 18, wherein estimating the registration parameters comprises regressing over the concatenated data with the CNN to predict the registration parameters, wherein the range profile data is a two-dimensional array and the concatenated data forms an image with two channels that is regressed by the CNN.

20. The SAR of claim 19, wherein the CNN is trained by a sub-method that comprises:

synthesizing template range profile data of a simulated scene;

synthesizing observed range profile data of the simulated scene with random registration parameters;

concatenating the synthesized range profile data with the synthesized template range profile data to form concatenated synthesized data;

feeding the concatenated synthesized data to the CNN;

estimating simulated registration parameters associated with the concatenated synthesized data;

running a backpropagation on a difference between the predicted registration parameters and the simulated parameters; and updating the CNN with the backpropagation.

* * * * *